Patented Nov. 12, 1935

2,020,665

UNITED STATES PATENT OFFICE 2,020,665

PROCESS OF MAKING BASIC LEAD TRINITRORESORCINOL

Hans Tauson, New Haven, Conn., assignor to Winchester Repeating Arms Company, New Haven, Conn., a corporation of Maryland No Drawing. Application September 23, 1933, Serial No. 690,777

7 Claims. (Cl. 260—11)

This invention has for its object the production of basic lead trinitroresorcinol and more particularly to the production of this material in a physical form suitable for use as an ingredient of priming mixtures for small arms ammunition.

Lead trinitroresorcinol is prepared by adding a solution of lead nitrate to a solution of trinitroresorcinol. I have found that by properly controlling the alkalinity of the trinitroresorcinol solution to which the lead nitrate is added, I can obtain basic lead trinitroresorcinol having the following formula:

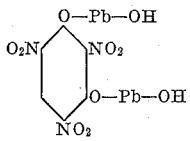

in a physical form that is suitable for use in the preparation of priming mixtures.

My invention further comprises certain subsequent treatment whereby the precipitate is purified and dried to produce basic lead trinitroresorcinol in a physical form that permits it to be properly mixed with other ingredients of a priming mixture.

In a typical embodiment of my invention a solution of trinitroresorcinol is prepared comprising 100 grams of trinitroresorcinol to 2 liters of filtered water. I also prepare a solution of lead nitrate consisting of 270 grams to 1 liter of filtered water. The trinitroresorcinol solution is made slightly alkaline and for this purpose I preferably employ from 70 to 90 cc. of ammonium hydroxide. It is then diluted with two liters of water and 100 cc. of ammonium hydroxide added thereto.

In carrying out the reaction between the trinitroresorcinol and the lead nitrate the solution of trinitroresorcinol is agitated until the entire quantity is definitely whirling in one direction. The lead nitrate solution is then added being slowly delivered drop by drop at first and the speed thereof increased so that the whole of the lead nitrate solution is added to the trinitroresorcinol solution in about twenty-five minutes. The agitation is continued for a few minutes after the last of the lead nitrate solution has been added to the reaction vessel. During the precipitation the temperature of the trinitroresorcinol solution in the reaction vessel is maintained between 35 and 50° C. The solution is then allowed to settle and the clear liquor poured off. The precipitate comprising the impure basic lead trinitroresorcinol is then washed at room temperature. Approximately 3 liters of water are added and the contents stirred. This washing operation may be repeated any desired number of times. I have found that the washing is generally complete after three washings.

The washed precipitate is then dehydrated, preferably by the use of spent alcohol. I generally employ a solution of methyl alcohol of about 76%. The precipitate is washed into a funnel lined with filter paper with the alcohol and the mixture of alcohol and water removed by suction. It is then given three alcohol washes and as a result the water content is reduced to less than 1%. The precipitate is then treated to dealcoholize it. This may be done by employing spent ether (95%) or dichlorethyl ether. It is then washed with one liter of 100% ether and this wash may be repeated as many times as necessary to remove the alcohol. During washing with the alcohol and ether agitation of the material is avoided, the liquid being merely poured over the paste and removed by suction.

After the ether washes, the alcohol content should be less than 5%. The ether may be removed by taking the precipitate from the filter paper of the funnel and placing it on a suitable support, such as a clean glass plate. It is then split up into small pieces and placed in a dry house or oven. By maintaining it at an elevated temperature, such as a temperature of 140° F., for an appropriate period of approximately 16 to 18 hours, all traces of the ether may be removed. It may then be mechanically ground to the desired size to produce the final product. The product resulting from the mechanical grinding or powdering may be employed in the preparation of wet priming mixtures. For the preparation of dry priming mixtures where granulation of a desired size is used, the material may be sifted through the required mesh and used.

By means of the process above outlined basic lead trinitroresorcinol having the above formula may be obtained in a physical shape suitable for use in the preparation of priming mixtures. The product is very sensitive, amorphous, sponge-like and is of a deep canary-yellow color.

It will be understood that the specific quantities, times and temperatures set forth above may be varied in the preparation of the product without departing from the spirit of the invention.

I claim:

1. The process of making basic lead trinitroresorcinol which comprises adding ammonium hydroxide to a solution of trinitroresorcinol until the solution is slightly alkaline and then adding a solution of lead nitrate thereto.

2. The process of making basic lead trinitroresorcinol which comprises adding ammonium hydroxide to a solution of trinitroresorcinol until the solution is slightly alkaline, then adding a solution of lead nitrate thereto and maintaining the solution at a temperature of from 35 to 50° C. during the reaction.

3. The process of making basic lead trinitroresorcinol which comprises adding ammonium hydroxide to a solution of trinitroresorcinol until the solution is slightly alkaline, slowly adding a solution of lead nitrate thereto and agitating the solution during the reaction.

4. The process of making basic lead trinitroresorcinol which comprises preparing a solution of trinitroresorcinol in the proportion of 100 grams to 2 liters of water, adding ammonium hydroxide in the proportion of 70 to 90 cc. thereto, diluting the solution with 2 liters of water, adding 100 cc. of ammonium hydroxide thereto and then adding a solution of lead nitrate thereto in the proportion of 270 grams to 1 liter of water.

5. The process of making basic lead trinitroresorcinol which comprises preparing a solution of trinitroresorcinol in the proportion of 100 grams to 2 liters of water, adding ammonium hydroxide in the proportion of 70 to 90 cc. thereto, diluting the solution with 2 liters of water, adding 100 cc. of ammonium hydroxide thereto, then adding a solution of lead nitrate thereto in the proportion of 270 grams to 1 liter of water and washing the precipitate with water.

6. The process of making basic lead trinitroresorcinol which comprises preparing a solution of trinitroresorcinol in the proportion of 100 grams to 2 liters of water, adding ammonium hydroxide in the proportion of 70 to 90 cc. thereto, diluting the solution with 2 liters of water, adding 100 cc. of ammonium hydroxide thereto, then adding a solution of lead nitrate thereto in the proportion of 270 grams to 1 liter of water, washing the precipitate with water, separating the precipitate from the water and dehydrating it with alcohol.

7. The process of making basic lead trinitroresorcinol which comprises preparing a solution of trinitroresorcinol in the proportion of 100 grams to 2 liters of water, adding ammonium hydroxide in the proportion of 70 to 90 cc. thereto, diluting the solution with 2 liters of water, adding 100 cc. of ammonium hydroxide thereto, then adding a solution of lead nitrate thereto in the proportion of 270 grams to 1 liter of water, washing the precipitate with water, separating the precipitate from the water, dehydrating it with alcohol and removing the alcohol by treating the precipitate with ether.

HANS TAUSON